United States Patent [19]

Mochida et al.

[11] Patent Number: 4,666,305
[45] Date of Patent: May 19, 1987

[54] FILM THICKNESS MEASURING APPARATUS EMPLOYING INTENSITY COMPENSATION DEVICE OF SPECTRAL REFLECTIVITY

[75] Inventors: Yoshihiro Mochida, Oume; Ichiro Shirahama, Chofu, both of Japan

[73] Assignee: Orc Manufacturing Co., Ltd., Tokyo, Japan

[21] Appl. No.: 723,569

[22] Filed: Apr. 15, 1985

[30] Foreign Application Priority Data

Sep. 20, 1984 [JP] Japan .................................. 59-197672

[51] Int. Cl.$^4$ ............................................. G01B 11/06
[52] U.S. Cl. ...................................... 356/381; 250/578
[58] Field of Search ............... 250/207, 559, 560, 578; 356/222, 319, 321, 323, 324, 325, 381, 382

[56] References Cited

U.S. PATENT DOCUMENTS

| | | | |
|---|---|---|---|
| 3,664,743 | 11/1969 | Kanda | 356/323 X |
| 3,827,811 | 8/1974 | Kato et al. | 356/219 X |
| 3,869,211 | 3/1975 | Watanabe et al. | 356/381 |
| 3,879,135 | 4/1975 | Egli et al. | 356/222 X |
| 4,355,903 | 10/1982 | Sandercock | 356/382 X |

*Primary Examiner*—Eugene R. LaRoche
*Assistant Examiner*—James C. Lee
*Attorney, Agent, or Firm*—Cushman, Darby & Cushman

[57] ABSTRACT

An improved film thickness measuring apparatus including an optical measuring system, a detective photomultiplier tube, a corrective photomultiplier tube, a control circuit and a signal processing section. Measuring of the film thickness of a sample material is carried out with the use of spectral reflectivity while optical interference takes place between light beam coming from the surface of the layer structure of the material and light beam coming from the base plate constituting the sample stage. Light beam from light source is introduced into a monochromator to spectrally transform it to monochromatic light. The optical measuring system includes a chopper which serves to chop light beam fed from the light source to introduce intermittent light beam into the monochromator. The latter is provided with a rotatable diffraction grating to effect scanning of wavelength. The second optical system includes a detective semi-transparent mirror, a corrective semi-transparent mirror and an objectve lens so that a part of monochromatic light beam is introduced into the detective photomultiplier tube via the detective semi-transparent mirror. A screen for the optical projection system is provided on the front surface of the housing section to visually observe an image of the sample material in an enlarged scale.

8 Claims, 3 Drawing Figures

FILM THICKNESS MEASURING APPARATUS EMPLOYING INTENSITY COMPENSATION DEVICE OF SPECTRAL REFLECTIVITY

BACKGROUND OF THE INVENTION

1. Field of the Invention

The present invention relates to a film thickness measuring apparatus and more particularly to improvement of or relating to an apparatus for measuring film thickness of material with the use of spectral reflectivity.

2. Description of the Prior Art

It is observed that when monochromatic light generated by the monochromator is emitted toward the surface of the film structure of the material of which film thickness is to be measured, reflection interference takes place in dependence on wavelength of the introduced light beam. Since there is existent a specific relation between the number of fringes each of which includes a bright portion (or a dark portion) and the thickness of the film structure, it is possible to measure the thickness of a film by counting the number of fringes relative to wavelength of employed light beam.

As is well known, a film thickness measuring apparatus of the above-mentioned type has spectral intensity distribution as typically illustrated in FIG. 3 in which abscissa represents wavelength in nm and ordinate does reflection intensity. Spectral intensity distribution for light source, diffraction grating and photomultiplier tube constituting the film thickness measuring apparatus are exemplified in the range of 400 nm to 800 nm in the drawing. As is apparent from the drawing, performance of the light source extends in the form of a curve 10 which rises at a steep inclination angle in the region of short wavelength on the assumption that a tungsten lamp is employed for the light source. On the other hand, spectral intensity distribution of the diffraction grating is represented in the form of a curve 12 which extends downwardly in the region located in the vicinity of both ends of wavelength. Further, a curve 14 represents output performance of photomultiplier tube. As is apparent from the drawing, the curve 14 extends downwardly at a steep inclination angle in the region where light beam has long wavelength. Accordingly, spectral intensity distribution finally detected by the photomultiplier tube is represented by compound spectral intensity distribution as represented by a curve 16 which is constituted by a combination of those of light source, diffraction grating and photomultiplier tube as illustrated by the curves 10, 12 and 14. The compound spectral intensity distribution curve 16 represents a curve which has lower sensitivity in both the regions, one of them being such that light beam has longer wavelength and the other one being such that it has shorter wavelength, but it has higher sensitivity in the intermediate region. Namely, the curve 16 extends in the form of a curve having the convex configuration. Further, the curve 16 is superimposed with spectral reflection spectrum curve 18 which is obtained by a number of measurements of film thickness of the material.

However, it has been found that the conventional film thickness measuring apparatus utilizing compound spectral intensity distribution as described above has a drawback that measuring accuracy of spectral reflection spectrum decreases remarkably in the region located in the vicinity of 400 nm and 800 nm where the curve extends downwardly at a steep inclination angle. Namely, the apparatus has a problem that peak and dip on the curve are discriminated only with reduced accuracy. This means that the conventional apparatus carries out measurements of film thickness with undesirable inaccuracy.

SUMMARY OF THE INVENTION

Thus, the present invention has been made with the foregoing background in mind and its object resides in providing an improved film thickness measuring apparatus which assures that the compound spectral intensity distribution constituted by a combination of those of light source, diffraction grating and photoelectronic tube is kept constant over the whole region of measured wavelength at all time by processing electric signals and moreover reflection spectrum obtained by scanning of wavelength is detected with the same accuracy over the whole region of wavelength while eliminating the error due to the effect of background distribution of the apparatus to calculate the required film thickness, as schematically illustrated by curves 76 and 78 in FIG. 3.

To accomplish the above object there is proposed according to the present invention an apparatus for measuring film thickness of a film on certain material essentially comprising an optical measuring system including a light source for generating light beam to be emitted, a first optical system, a monochromator into which light beam collected by means of the first optical system is introduced to spectrally transform it to monochromatic light and a second optical system into which thus generated monochromatic light is introduced to reach the surface of the film layer on the material to be measured, a detective photomultiplier tube into which reflected light from the surface of the film layer is introduced to output photoelectric current in proportion to the intensity of reflected light, a corrective photomultiplier tube into which a part of light beam emitted through the second optical system is introduced to generate photoelectric current in proportion to the intensity of thus introduced light, a control circuit for controlling voltage to be applied to the detective photomultiplier tube by processing signal corresponding to thus generated photoelectric current and a signal processing section for processing photoelectric current signal transmitted from the detective photomultiplier tube by detecting photoelectric current from the latter so that photoelectric current signal is outputted from the signal processing section.

The first optical system in the optical measuring system is intended to produce white light to be emitted through the lens to the chopper where the light beam is converted to intermittent light beam to be introduced into the monochromator. The chopped light beam is changed at the monochromator into monochronous light which is fed through the second optical system onto the film surface 33 of the sample material 32.

Usually, the monochromator is provided with a rotatable diffraction grating to effect scanning of wavelength.

Further, the second optical system includes a detective semi-transparent mirror, a corrective semi-transparent mirror and an objective lens so that a part of monochromatic light beam is introduced into the detective photomultiplier tube via the detective semi-transparent mirror.

In a preferred embodiment of the invention an additional semi-transparent mirror is disposed at a predetermined position located between both the semi-transparent mirrors to take out a part of light beam in the optical measuring system to deliver it to an optical projecting system.

Usually, the optical projecting system includes a screen located on the front surface of the housing section to visually observe an image of the material in an enlarged scale and a hood for inhibiting undesirable foreign light from reaching the screen.

According to the invention the control circuit includes a synchronous rectifying circuit and a high voltage generating circuit and an amplifier is interposed between the corrective photomultiplier tube and the control circuit.

Further, according to the invention the signal processing section includes a synchronous rectifying circuit, a signal processing device and a display device and another amplifier is interposed between the detective photomultiplier tube and the signal processing section.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to the accompanying drawings which illustrate an embodiment thereof.

Figure 1:
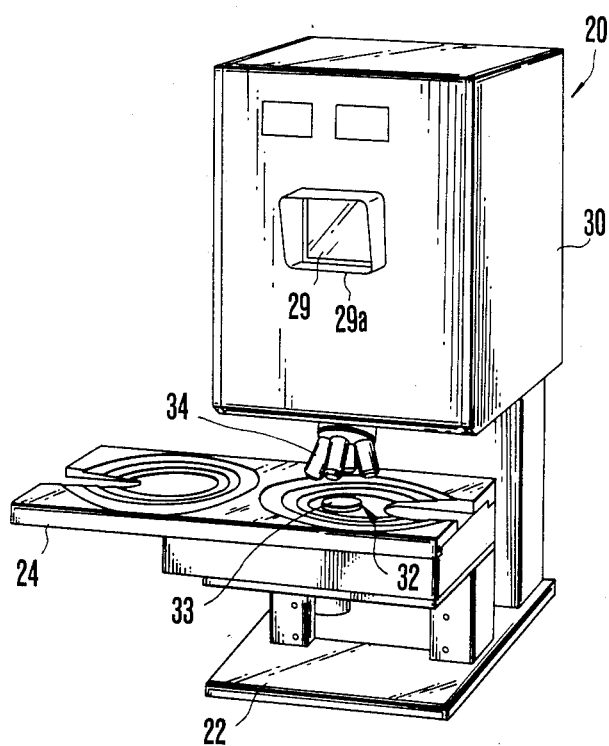
FIG. 1 is a perspective view of a film thickness measuring apparatus according to an embodiment of the invention.

First, referring to FIG. 1 which is a perspective view of an apparatus according to the invention, a film thickness measuring apparatus 20 (hereinafter referred to simply as apparatus) includes a table 22, a sample stage 24 located above the table 22 to place a material 32 thereon which has a layer of film 33 of which thickness is intended to be measured and a housing section 30 located also above the table 22. Specifically, the housing section 30 has an optical measuring system 26, an optical projecting system 28, photomultiplier tubes 58 and 66, a control circuit 60 for the photomultiplier tubes 58 and 66 and a signal processing section 68 all of which are incorporated in the housing section 30. Further, the apparatus is provided with an objective lens 34 constituting the optical measuring system 26 at the position located below the housing section 30. Obviously, the objective lens 34 is directed toward the material 32 to be measured. As is apparent from FIG. 1, the housing section 30 includes a screen 29 and a hood 29a for inhibiting undesired foreign light from being introduced onto the screen 29 from the outside. Incidentally, the screen 29 located on the front surface of the housing section 30 is adapted to project an image of the film layer 33 on the material 32 in an enlarged scale via the objective lens 34 and the optical projecting system 28.

Figure 2:
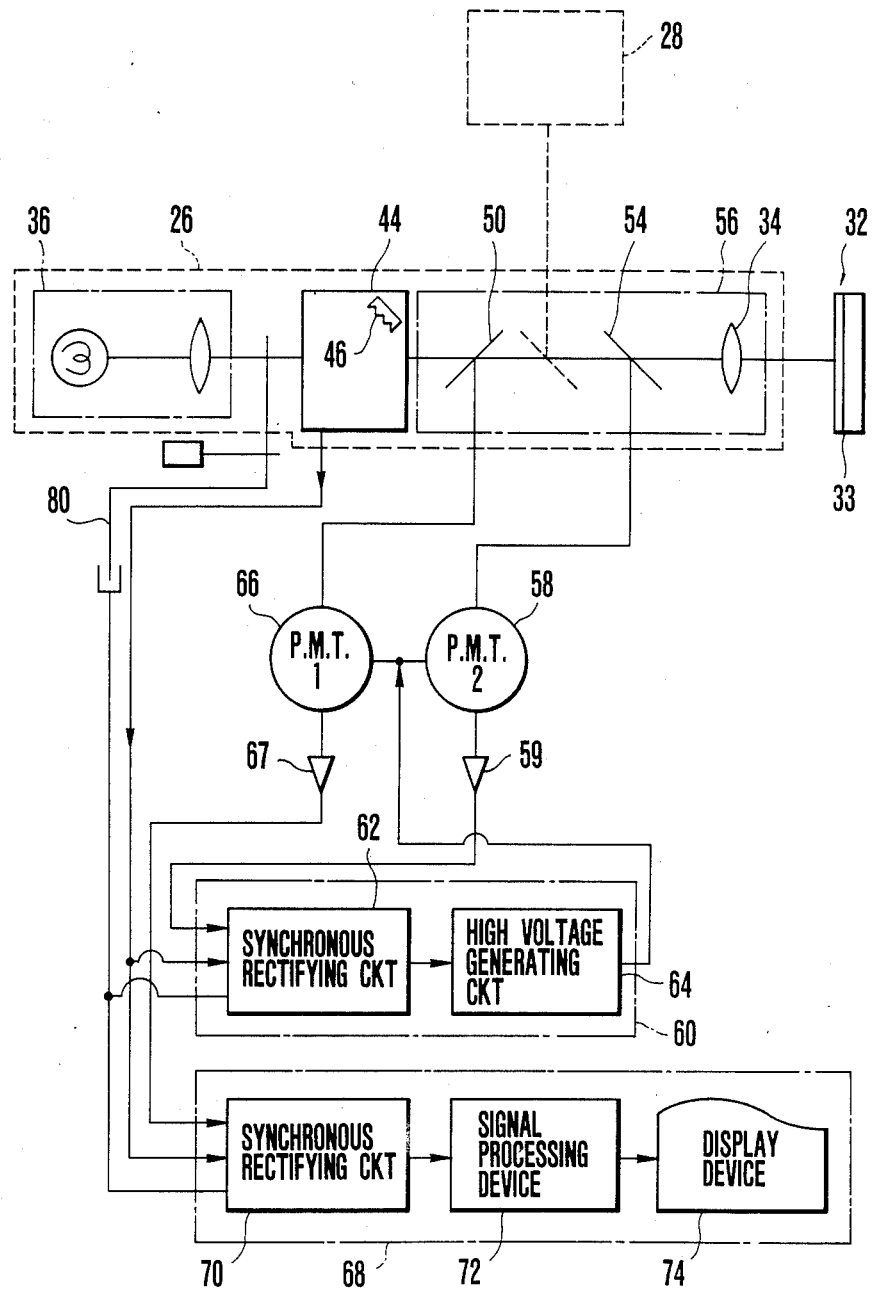
FIG. 2 is a block diagram schematically illustrating the structure of the apparatus in FIG. 1.
Figure 3:
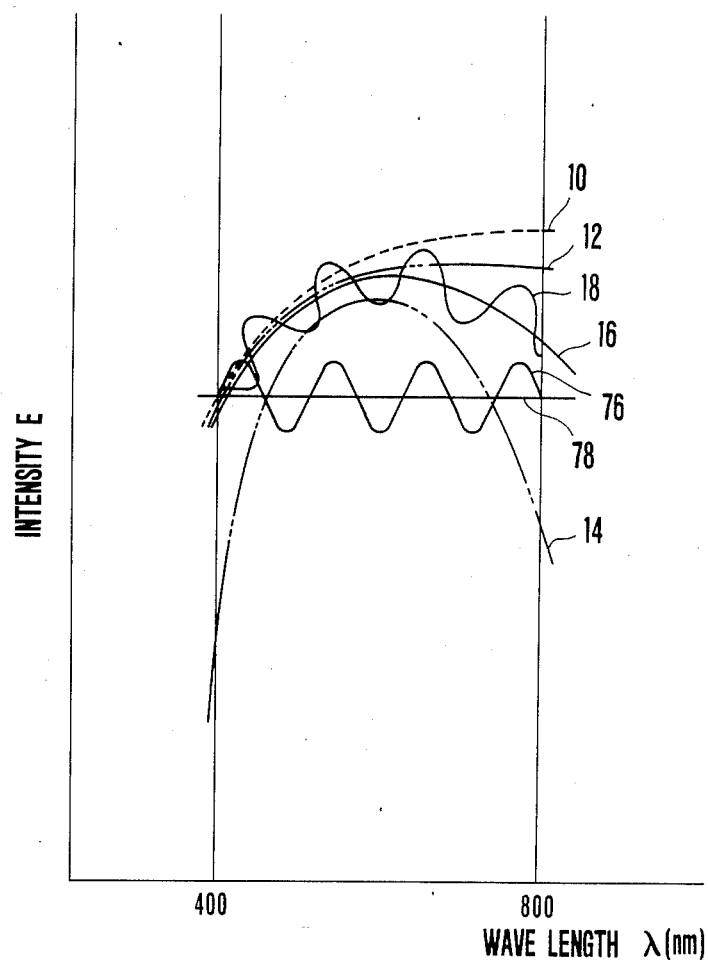
FIG. 3 is a diagram particularly illustrating a plurality of characteristic curves relative to output intensity distribution versus wavelength, wherein reference numeral 76 represents a spectral reflection spectrum curve of the apparatus of the invention and reference numeral 78 does a compound spectral intensity distribution curve of the apparatus of the invention.

Next, referring to FIG. 2 which schematically illustrates the apparatus by way of a block diagram, the apparatus includes a semi-transparent mirror 54, a photomultiplier tube 58 adapted to generate photoelectric current in proportion to the intensity of light beam reflected at the semi-transparent mirror 54 and an amplifier 59 in the same manner as in the case of a conventional film thickness measuring apparatus. Then, thus, generated photoelectric current is inputted into the control circuit 60 and thereby high voltage to be applied to the photomultiplier tube 66 is controlled as required.

Namely, in the illustrated embodiment the apparatus includes an optical measuring system 26, a corrective photomultiplier tube 58 into which a part of monochromatic light reflected at the semi-transparent mirror 54 in the optical measuring system 26 is inputted, an amplifier 59, a detective photomultiplier tube 66 into which reflected light coming from the surface of the film layer 33 via another semi-transparent mirror 50 is introduced, after reflection interference has taken place between light coming from the surface of the film structure 33 on the material 32 and light coming from the surface of the base plate constituting the sample stage 24, an amplifying circuit 67, a synchronous rectifying circuit 62 and a high voltage generating circuit 64. Thus, high voltage is generated in dependence on direct current signal component corresponding to electric current outputted from the corrective photomultiplier tube 58. Further, control circuit 60 controls high voltage to be applied to both the corrective photomultiplier tube 58 and the detective photomultiplier tube 66. The apparatus further includes a synchronous rectifying circuit 70, a signal processing section 72 and a display device 74. Moreover, the apparatus includes a signal processing section 68 in which signal voltage corresponding to distribution of spectral intensity obtainable by way of the steps of inputting signal outputted from the detective photomultiplier tube 66 is adapted to be outputted to the display device 74. It should be noted that the optical measuring system 26 includes a first optical system 36, a chopper 80, a monochromator 44 adapted to rotate the diffraction grating 46 to measure the rotation angle of the latter and a second optical system 56 which comprises a detective semi-transparent mirror 50, a semi-transparent mirror (as identified by a dotted line) for taking out a part of light beam emitted through the first optical system in the optical measuring system to deliver it to the optical projecting system 28, a corrective semi-transparent mirror 54 and an objective lens 34.

Next, operation of the apparatus of the invention will be described below.

As illustrated in FIG. 2, the optical measuring system 26 includes a first optical system 36 which serves to emit light beams to be finally fed towards the film surface 33 of the sample material 32. After leaving the first optical system 36, white light is chopped by means of the chopper 80 to achieve intermittent transmission of light beam whereby chopped light is introduced into the monochromator 44.

The monochromator 44 is provided with a rotatable diffraction grating 46 so that scanning of wavelength can be achieved by the rotation of the diffraction grating 46.

Then, monochromatic light emitted from the monochromator 44 is transmitted onto the film surface 33 of the sample material 32 via the second optical system 56 which comprises a detective semi-transparent mirror 50, a corrective semi-transparent mirror 54 and an objective lens 34 in the above-described manner.

A part of monochromatic light is reflected at the corrective semi-transparent mirror 54 and it is then introduced into the corrective photomultiplier tube 58. This corrective photomultiplier tube 58 generates an intensity of photoelectric current in proportion to the intensity of incident light. Thus generated photoelectric current is amplified by the amplifying circuit 59 and thereafter it is inputted into the control circuit 60.

As described above, the control circuit 60 comprises a synchronous rectifying circuit 62 and a high voltage generating circuit 64 so that the photoelectric current generated in that way is first inputted into the synchronous rectifying circuit 62. In response to operation of the synchronous rectifying circuit 62 signal component of direct current corresponding to thus inputted photoelectric current is outputted therefrom and it is then inputted into the high voltage generating circuit 64. High voltage level is controlled by the high voltage generating circuit 64 by utilizing the signal component which has been transmitted from the synchronous rectifying circuit 62, and high voltage is then applied to both the corrective photomultiplier tube 58 and the detective photomultiplier tube 66. Specifically, controlling of high voltage is effected in such a manner that high voltage for photomultiplier application generated by the high voltage generating circuit becomes higher when detected signal is small but it becomes lower when it is large. Since this high voltage is applied to both the corrective photomultiplier tube 58 and the detective photomultiplier tube 66, it results that photoelectric current signal detected by the detective photomultiplier tube 66 corrects spectrum intensity distribution of the light source, the diffraction grating and the photomultiplier tube so as to make distribution flat over the wavelength region concerned.

Reflected light which has come from the film surface 33 is caused to interfere with light which has come from the surface of the base plate constituting the sample stage 24 and the former is then introduced into the detective photomultiplier tube 66 via the semi-transparent mirror 50 to output photoelectric current. This photoelectric current is amplified in the amplifying circuit 67 and thus amplified photoelectric current is then inputted into the signal processing section 68.

As described above, the signal processing section 68 essentially comprises a synchronous rectifying circuit 70, a signal processing device 72 and a display device 74 so that photoelectric current is first inputted into the synchronous rectifying circuit 70. Signal component of direct current corresponding to thus inputted photoelectric current is outputted from the synchronous rectifying circuit 70 and it is then inputted into the signal processing device 72. Signal voltage corresponding to the distribution of reflection spectrum obtained by scanning of wavelength is amplified and then processed in the signal processing device 72. The result, that is, film thickness of the material or reflection spectrum is outputted on the display device 74.

As will be readily understood from the above description, the present invention consists in that in addition to a detective photomultiplier tube the apparatus is provided with a corrective photomultiplier tube for correctively controlling voltage to be applied to the detective photomultiplier tube. Thus, composite wavelength output performances relative to light source, diffraction grating, detective photomultiplier tube or the like component or element can be maintained at a constant level at all time. Moreover, distribution of reflection spectrum can be detected with the same measuring accuracy without any occurrence of measuring error. Accordingly, a required thickness of the film layer can be calculated more accurately than the conventional apparatus of the same type in which no correction is effected.

While the present invention has been described above only with a single preferred embodiment, it should of course be understood that it should not be limited only to this but various changes or modifications may be made in any acceptable manner without departure from the spirit and scope of the invention as defined by the appended claims.

What is claimed is:

1. An apparatus for measuring the thickness of a film on certain material essentially comprising;
   an optical measuring system including a light source for generating light beam to be emitted, a first optical system, a monochromator into which light beam collected by means of said first optical system is introduced to spectrally transform it to monochromatic light and a second optical system into which thus generated monochromatic light is introduced to reach the surface of the film layer on the material to be measured,
   a detective photomultiplier tube into which reflected light from the surface of the film layer is introduced to output photoelectric current in proportion to the intensity of reflected light,
   a corrective photomultiplier tube into which a part of light beam emitted through said second optical system is introduced to generate photoelectric current in proportion to the intensity of thus introduced light,
   a control circuit for controlling voltage to be applied to said detective photomultiplier tube by processing signal corresponding to thus generated photoelectric current and
   a signal processing section for processing photoelectric current signal transmitted from the detective photomultiplier tube by detecting photoelectric current from the detective photomultiplier so that photoelectric current signal is outputted from said signal processing section.

2. An apparatus as defined in claim 1, wherein said first optical system produces white light to be emitted through a lens to a chopper where the light beam is converted to an intermittent light beam to be introduced into the monochromator; the chopped light beam being changed at the monochromator into monochronous light which is fed through the second optical system onto the film surface of the sample material.

3. An apparatus as defined in claim 1, wherein said monochromator is provided with a rotatable diffraction grating to effect scanning of wavelength.

4. An apparatus as defined in claim 1, wherein said second optical system includes a detective semi-transparent mirror, a corrective semi-transparent mirror and an objective lens so that a part of monochromatic light beam is introduced into said detective photomultiplier tube via said detective semi-transparent mirror.

5. An apparatus as defined in claim 4, wherein an additional semi-transparent mirror is disposed at a predetermined position located between both the semi-transparent mirrors to take out a part of light beam in the optical measuring system to deliver it to an optical projecting system.

6. An apparatus as defined in claim 5, wherein said optical projecting system comprises a screen located on the front surface of a housing section of the apparatus to visually observe an image of the material in an enlarged scale and a hood for inhibiting foreign light from reaching said screen.

7. An apparatus as defined in claim 1, wherein said control circuit includes a synchronous rectifying circuit and a high voltage generating circuit and an amplifier is interposed between the corrective photomultiplier tube and the control circuit.

8. An apparatus as defined in claim 1, wherein said signal processing section includes a synchronous rectifying circuit, a signal processing device and a display device and an amplifier is interposed between the detective photomultiplier tube and the signal processing section.

* * * * *